United States Patent
Zhou et al.

(10) Patent No.: US 7,639,517 B2
(45) Date of Patent: Dec. 29, 2009

(54) ADAPTIVE OUTPUT CURRENT CONTROL FOR SWITCHING CIRCUITS

(75) Inventors: Xigen Zhou, San Jose, CA (US); David Roy Ng, San Jose, CA (US); Steven M. Pietkiewicz, Fremont, CA (US); Robert C. Dobkin, Monte Sereno, CA (US)

(73) Assignee: Linear Technology Corporation, Milpitas, CA (US)

( * ) Notice: Subject to any disclaimer, the term of this patent is extended or adjusted under 35 U.S.C. 154(b) by 371 days.

(21) Appl. No.: 11/703,718

(22) Filed: Feb. 8, 2007

(65) Prior Publication Data

US 2008/0192514 A1 Aug. 14, 2008

(51) Int. Cl.
*H02M 3/335* (2006.01)

(52) U.S. Cl. ............ 363/21.17; 363/21.09; 363/97

(58) Field of Classification Search ........... 363/21.01, 363/21.04, 21.09, 21.12, 21.17, 97
See application file for complete search history.

(56) References Cited

U.S. PATENT DOCUMENTS

| | | | | |
|---|---|---|---|---|
| 5,812,383 A * | 9/1998 | Majid et al. | ............ | 363/21.05 |
| 5,991,172 A | 11/1999 | Jaovanovich et al. | | |
| 7,054,170 B2 * | 5/2006 | Yang et al. | ............ | 363/21.18 |
| 2005/0248965 A1 * | 11/2005 | Yamada et al. | ............ | 363/21.08 |
| 2006/0050539 A1 * | 3/2006 | Yang et al. | ............ | 363/21.16 |
| 2006/0055433 A1 | 3/2006 | Yang et al. | | |
| 2008/0031018 A1 * | 2/2008 | Negrete | ............ | 363/21.17 |
| 2008/0123372 A1 * | 5/2008 | Yang | ............ | 363/21.16 |
| 2009/0086514 A1 * | 4/2009 | Fornage et al. | ............ | 363/21.17 |

FOREIGN PATENT DOCUMENTS

| | | |
|---|---|---|
| EP | 0704 956 A1 | 9/1995 |
| EP | 1 146 630 A2 | 3/2001 |
| JP | 2005-94835 | 4/2005 |
| KR | 10-0316097 | 11/2001 |

OTHER PUBLICATIONS

International Search Report and Written Opinion of the International Searching Authority issued in International Patent Application No. PCT/US2007/025394 dated on May 8, 2008.

* cited by examiner

*Primary Examiner*—Jeffrey L Sterrett
(74) *Attorney, Agent, or Firm*—McDermott Will & Emery LLP

(57) ABSTRACT

System and methodology for controlling output current of switching circuitry having an input circuit and an output circuit electrically isolated from each other. A value of the output current may be determined based on input voltage, input current and reflected output voltage representing the voltage in the input circuit which corresponds to the output voltage. A switching element in the input circuit is controlled to produce the determined value of output current.

57 Claims, 6 Drawing Sheets

BACKGROUND

BACKGROUND

BACKGROUND

ADAPTIVE OUTPUT CURRENT CONTROL FOR SWITCHING CIRCUITS

TECHNICAL FIELD

The subject matter of this disclosure relates to power supply circuits, and more particularly to circuitry and methodology for controlling output current in a switching regulator. The disclosure has particular applicability but is not limited to flyback converters.

BACKGROUND

Some switching circuits, such as switching regulators for light emitting device (LED) drivers, need to accept power from a variety of voltage sources that may provide a wide range of input voltages—from low voltages produced by DC sources to high voltages supplied from rectified AC lines. In addition, switching circuits may be subject to load uncertainty. For example, LEDs inherently have highly variable I-V characteristics. The variable number of LEDs that may be driven by a LED driver exaggerates the load uncertainty.

Since the light emission of a LED is directly related to current flowing through the LED, the output current of a LED driver should be accurately controlled. As the output current of the LED driver depends on the input voltage, variations in the input voltage level create substantial problems for accurate output current control.

An isolated switching regulator, such as a flyback regulator, is used for LED drivers to accommodate a wide range of input voltages and load uncertainty. Moreover, the isolating arrangement of the flyback switching regulator separates an input voltage source from a load, providing additional safety protection.

However, the isolating arrangement also makes it more difficult to control the switching regulator since the control information should be relayed through the isolating barrier between the input and output sides of the regulator. Moreover, an opto-coupler creates a propagation delay in a feedback loop of a LED driver reducing system dynamics and accuracy.

Therefore, it would be desirable to provide control circuitry and methodology for controlling output current in an isolated switching regulator without directly measuring the current or voltage at the output side of the regulator.

SUMMARY OF THE DISCLOSURE

In accordance with one aspect of the disclosure, a method is offered for controlling an output current of switching circuitry having an input circuit for receiving an input voltage and an input current, and an output circuit for developing an output voltage. The output circuit is electrically isolated from the input circuit. The method involves predetermining a value of the output current in the output circuit based on the input voltage, the input current and a reflected output voltage obtained at the input circuit, and controlling a switching element in the input circuit to produce the determined value of output current.

The output current value may be determined so as to reduce variation of the output current with a change in the input voltage and the output voltage.

The switching element which may include an inductive element having a first winding isolated from a second winding, may be controlled to operate the switching circuit in a boundary conduction mode (BCM), a continuous conduction mode (CCM), or a discontinuous conduction mode (DCM).

In accordance with another aspect of the disclosure, a system is provided for controlling an output current of switching circuitry including an input circuit for receiving an input voltage and an input current, and an output circuit for producing an output voltage. The output circuit is electrically isolated from the input circuit. The system comprises a switching control circuit for controlling a switching element in the input circuit so as to control the output current in the output circuit. The switching control circuit is configured for determining a value of the output current based on the input voltage, the input current, and a reflected output voltage obtained at the input circuit, and for controlling the switching element to reduce variation of the output current with change in the input voltage and the output voltage.

The switching control circuit may be further configured to control the switching element to produce the output current that is directly proportional to the input voltage and the input current, and inversely proportional to the reflected output voltage.

The input circuit may include a primary winding of an inductive element, and the output circuit may include a secondary winding of the inductive element. The switching control circuit may be further configured to control the switching element to produce the output current that is proportional to a turns-ratio of the inductive element.

The switching control circuit may be configured to operate the switching circuit in BCM, CCM or DCM.

In accordance with a further aspect of the disclosure, a method is offered for controlling switching circuitry including an input circuit and an output circuit electrically isolated from each other. The method involves determining a value of output current in the output circuit based on input voltage supplied to the input circuit and reflected output voltage representing voltage in the input circuit corresponding to output voltage developed in the output circuit. A switching element in the input circuit is controlled to produce the calculated value of the output current. The output current may be calculated to reduce its variation with a change in the input and output voltages of the switching circuit.

The switching circuit may operate in BCM and CCM. When the switching circuit operates in DCM, the output current is calculated based on the reflected output voltage.

In accordance with another aspect of the disclosure, a system for controlling switching circuitry including an input circuit and an output circuit electrically isolated from each other may have a switching control circuit for controlling a switching element in the input circuit to control current in the output circuit of the switching circuit. The switching control circuit is configured for determining the current in the output circuit based on the input voltage and the reflected output voltage.

In accordance with an embodiment of the disclosure, the input circuit may include a primary winding of an inductive element, and the output circuit may include a secondary winding of the inductive element.

When the switching circuit operates in BCM or CCM, the switching control circuit may control the switching element to produce the current in the output circuit directly proportional to the input voltage and inversely proportional to the sum of the input voltage and the reflected output voltage.

When the switching circuit operates in DCM, the switching control circuit may control the switching element to produce current in the output circuit inversely proportional to the reflected output voltage, and directly proportional to inductance of the inductive element and a switching frequency of the switching element.

In accordance with an embodiment of the disclosure, the switching control circuit may adjust a peak level of switch current in the switching element to produce the output current at the calculated level.

In particular, the switching control circuit may include a comparator for comparing the switch current with a reference value to switch the switching element when the switch current exceeds the reference value, and a reference circuit for producing the reference value.

In BCM and CCM, the reference circuit produces the reference value inversely proportional to the input voltage and directly proportional to the sum of the input voltage and the reflected output voltage.

In DCM, the reference circuit produces the reference value directly proportional to the square root of the reflected output voltage and inversely proportional to the square root of the inductance of the inductive element and the switching frequency of the switching element.

In accordance with a further aspect of the disclosure, a system for driving a light-emitting diode (LED) comprises a switching regulator for providing power supply to drive the LED. The switching regulator has an input circuit and an output circuit electrically isolated from each other. The input circuit may include a primary winding of an inductive element, and the output circuit may include a secondary winding of the inductive element. A control circuit is provided for controlling current in the output circuit of the switching regulator. The control circuit is configured for producing the current in the output circuit calculated based on input voltage supplied to the input circuit and reflected output voltage representing voltage in the input circuit corresponding to output voltage developed in the output circuit.

The control circuit may control the switching regulator operating in BCM and CCM to produce the current in the output circuit directly proportional to the input voltage and inversely proportional to the sum of the input voltage and the reflected output voltage.

When the switching regulator operates in DCM, the control circuit may control the switching regulator to produce current in the output circuit inversely proportional to the reflected output voltage and directly proportional to the inductance of the inductive element and the switching frequency of the switching regulator.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the example of a system for controlling output current of a flyback switching regulator for a LED driver. It will become apparent, however, that the concept of the disclosure is applicable to any switching circuit that produces controllable output current in response to input voltage.

Figure 1:
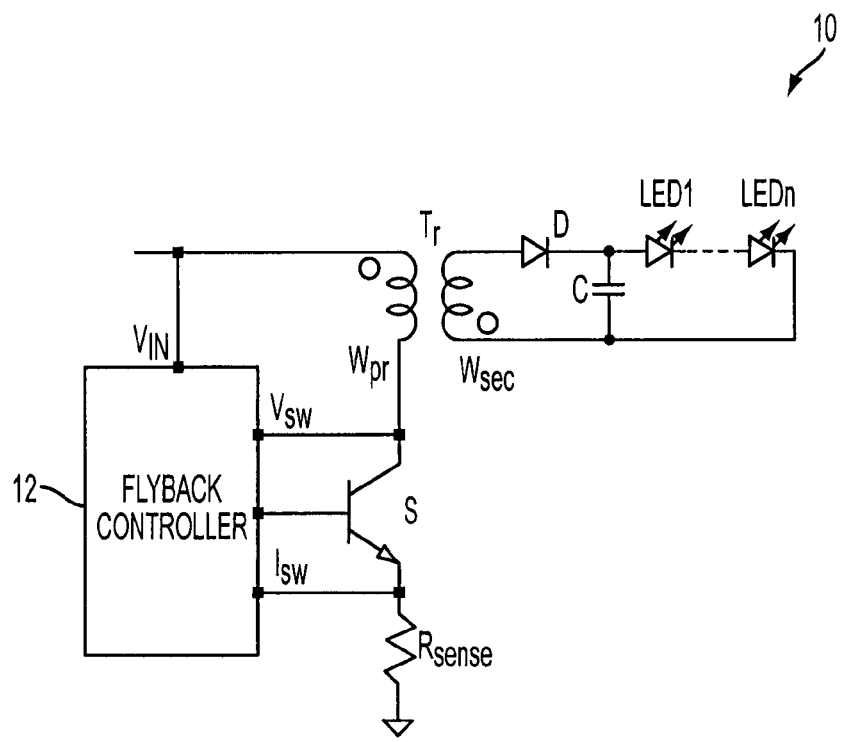
FIG. 1 shows an exemplary embodiment of a flyback switching regulator in accordance with the present disclosure.

FIG. 1 illustrates an exemplary isolated flyback switching regulator 10 for a LED driver. The regulator 10 has a switching element S, a transformer Tr with primary and secondary windings $w_{pr}$ and $w_{sec}$, and a controller 12 that controls switching of the switching element S. A sense resistor Rsense is coupled to the switching element S to monitor switch current Isw flowing through the switching element S. A capacitor C and a diode D are coupled to the secondary winding $w_{sec}$, together with LEDs 1 to n, driven by the LED driver. The flyback switching regular 10 may convert an input DC voltage Vin into one or more output DC voltages with very high power conversion efficiency.

As discussed below, a switching regulator of the present disclosure may be controlled to operate in a continuous conduction mode (CCM), a discontinuous conduction mode (DCM), or a boundary conduction mode (BCM). For example, when a flyback switching regulator operates in CCM, current in its transformer is always above zero, whereas in a DCM flyback switching regulator, current in the transformer falls to zero during a certain time period within each switching cycle. In BCM, a switching regulator operates at the boundary between CCM and DCM.

Figure 2:
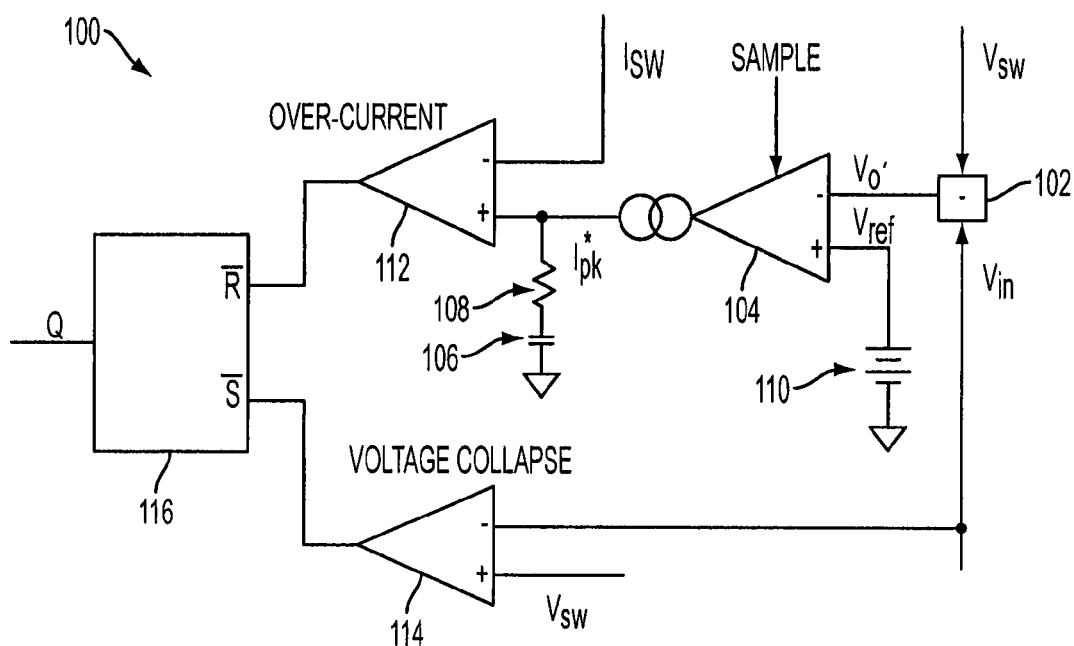
FIG. 2 illustrates a conventional output voltage control scheme for a switching regulator.

FIG. 2 illustrates a conventional output voltage control scheme for operating the flyback regulator 10 in a boundary conduction mode (BCM). An exemplary control system 100 for controlling the output voltage of the regulator 10 may include a subtraction circuit 102 that determines a difference Vo' between the input voltage Vin supplied to the switching regulator 10 and a switch voltage Vsw produced at the output of the switching element S. The voltage Vo' represents the reflected output voltage which is voltage at the primary side of the switching regulator 10 corresponding to the output voltage at the secondary side.

Also, the control system 100 includes a proportional and integral (PI) regulator having an operational amplifier 104 for producing output current in response to a voltage difference at its inputs, and an integrating circuit composed of a capacitor 106 and a resistor 108 coupled to the output of the amplifier 104. The voltage Vo' is supplied to an inverting input of the amplifier 104, whereas its non-inverting input is fed with a reference voltage Vref that may be supplied from a reference voltage source 110. The amplifier 104 includes a sample-and-hold circuit for sampling the voltage difference at the inputs of the amplifier 104 to enable the PI regulator to set a reference value Ipk* for the switch current Isw at a peak current level. The sampling rate of the sample-and-hold circuit may correspond to switching frequency f of the switching regulator 10.

Further, the control system 100 may include an overcurrent (OC) comparator 112, a voltage collapse (VC) comparator 114, and an RS flip-flop circuit 116 coupled to outputs of the comparators 112 and 114. The OC comparator 112 compares switch current Isw at the output of the switching element S with the peak current reference value Ipk* to produce an overcurrent signal OC when the switch current Isw reaches the peak current reference value Ipk*. For example, the switch current Isw may be determined by monitoring a voltage across the sense resistor Rsense.

The VC comparator 114 compares the input voltage Vin with the switch voltage Vsw to produce a voltage collapse signal VC when the switch voltage Vsw falls below the input voltage Vin. The VC signal is supplied to the RS flip-flop circuit 116 to set a gate control signal at the Q-output of the RS flip-flop circuit 116. When the gate control signal is set, it turns on the switching element S. The OC signal is applied to the RS flip-flop circuit 116 to reset the gate control signal at the Q-output. When the gate control signal is reset, it turns off the switching element S. Hence, to operate the switching regulator 10 in BCM, the VC signal generated during the off period of the switching element S turns the switch on immediately after the current in the secondary winding falls to zero.

Figure 3:
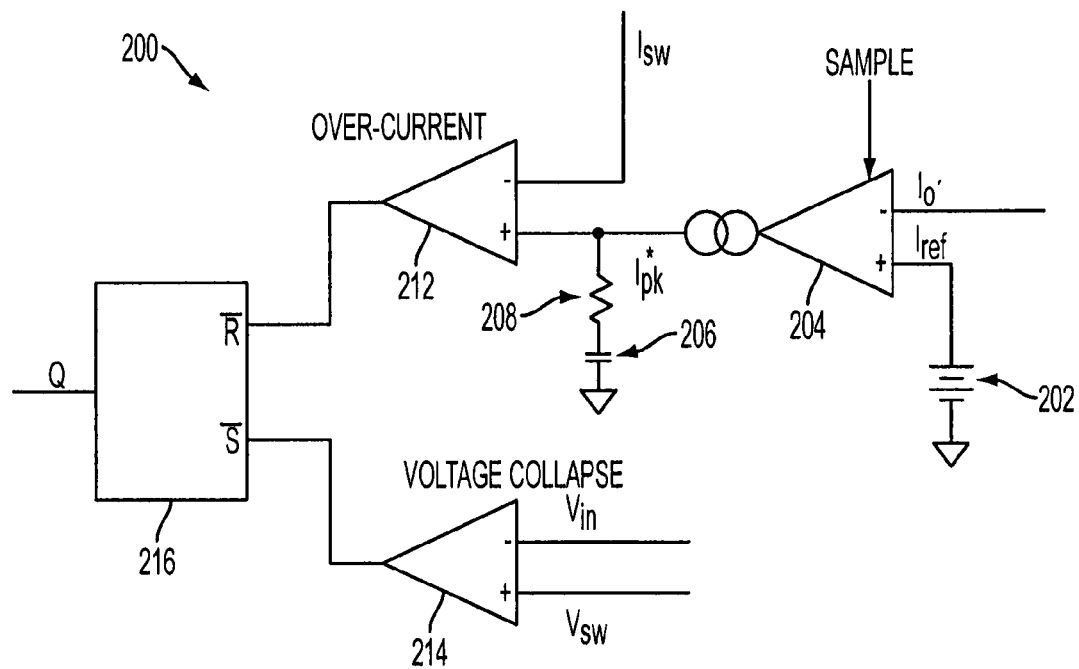
FIG. 3 illustrates a conventional output current control scheme for a switching regulator.

FIG. 3 illustrates a conventional output current control scheme for operating the switching regulator 10 in BCM. An exemplary control system 200 for controlling the output current of the switching regulator 10 includes a reference current source 202 that produces reference current Iref and a PI regulator that compares reflected output current Io' of the switching regulator with the reference current Iref. The reflected output current Io' represents current in the primary winding $w_{pr}$ corresponding to the output current in the secondary winding $w_{sec}$ of the switching regulator 10. For example, the reflected output current Io' may be determined based on the sense current in the sense resistor Rsense.

The PI regulator includes an operational amplifier 204 and an integrating circuit composed of a capacitor 206 and a resistor 208. The operational amplifier 204 compares the current Io' with the Iref value and performs sampling of the current difference on its inputs to enable the PI regulator to set a reference value Ipk* for the switch current Isw at a peak current level. The sampling rate may correspond to switching frequency f of the switching regulator 10.

Further, the control system 200 includes an OC comparator 212, a VC comparator 214, and an RS flip-flop circuit 216 coupled to outputs of the comparators 212 and 214. The OC comparator 212 compares the switch current Isw with the peak current reference level Ipk* to produce an overcurrent signal OC when the switch current Isw reaches the peak current reference level Ipk*.

The VC comparator 214 compares the input voltage Vin with the switch voltage Vsw to produce a voltage collapse signal VC when the switch voltage Vsw falls below the input voltage Vin. The VC signal is supplied to the RS flip-flop circuit 216 to set a gate control signal at the Q-output of the RS flip-flop circuit 216. When the gate control signal is set, it turns on the switching element S. The OC signal is applied to the RS flip-flop circuit 216 to reset the gate control signal at the Q-output. When the gate control signal is reset, it turns off the switching element S. Hence, the control system 200 controls switching of the regulator 10 to maintain a desired level of its output current.

Figure 4:
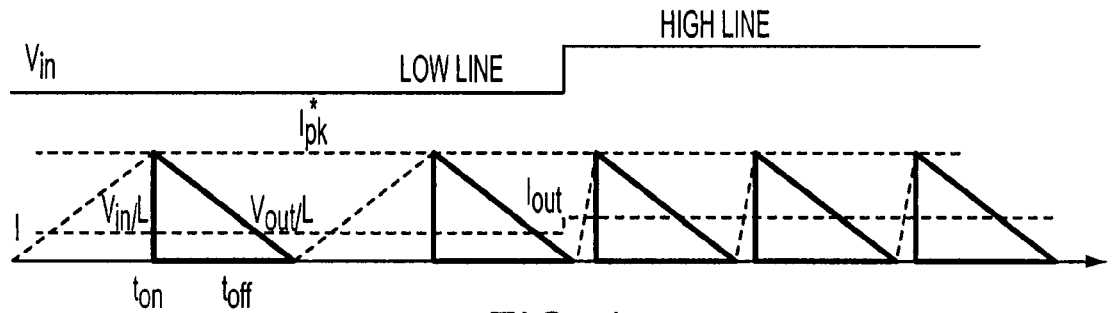
FIG. 4 is a timing diagram illustrating the conventional output current control scheme.

However, as the timing diagram of FIG. 4 illustrates, the output current of the regulator 10 maintained by the control system 200 changes with variations of the input voltage Vin. The waveform I represents the transformer current in the regulator 10 operating in BCM. In particular, the dotted up-slope of the waveform I represents current in the primary side of the regulator 10 during an on-time $t_{on}$ of the switching element S switching at frequency f, whereas the solid down-slope of the waveform I represents current in the secondary side of the regulator 10 during an off-time $t_{off}$ of the switching element S. The up-slope is determined by a ratio Vin/L, where Vin is the input voltage of the regulator 10 and L is the inductance of the transformer Tr. The down-slope is determined by a ratio Vout/L, where Vout is the output voltage of the switching regulator 10. The solid triangle area in the waveform I represents total charge transferred to the secondary side of the regulator 10. The output current Iout of the regulator 10 corresponds to the average value of current represented by dotted and solid triangle areas in the waveform I, i.e. corresponds to the average value of the current over the switching cycle of the regulator 10.

As shown in FIG. 4, when the input voltage Vin is low, it takes substantial time for the primary side current to reach the peak current reference level Ipk* during BCM operation. Therefore, the switching frequency is low. If the on-time $t_{on}$ of the switching element S is equal to its off-time $t_{off}$, the output current is ¼ of the peak current. When the input voltage Vin is high, it takes less time to produce the primary side current at the peak current reference level Ipk*. Therefore, the switching frequency is high. Neglecting the insignificant on-time, the output current is approximately ½ of the peak current. Hence, if the peak current level is maintained at the same value during input voltage perturbations, the output current will increase with the input voltage.

Figure 5:
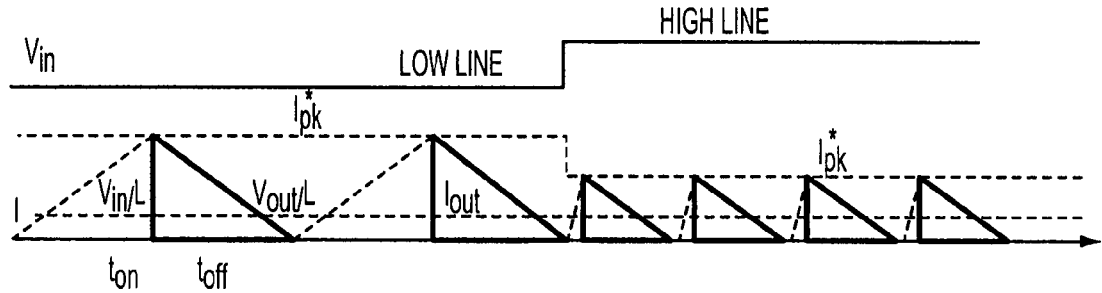
FIG. 5 is a timing diagram illustrating adaptive control of a peak current reference level in accordance with the present disclosure.

As illustrated in FIG. 5, in accordance with the present disclosure, the output current Iout of a switching regulator may be controlled by calculating the Iout value based on the input voltage Vin and the reflected output voltage Vo'. As a result, a substantially constant level of the output current Iout may be maintained despite input voltage perturbations caused by changes in input power line conditions and output voltage variations caused by changes in load conditions.

Moreover, the technique of the present disclosure does not need direct measurements of the output current or the output voltage to control the output current level. As discussed above, in an isolated switching regulator, such as a flyback regulator, the isolating barrier between the input and output sides of the regulator makes it difficult to control the switching regulator by measuring its output side parameters since the control information should be relayed through the isolating barrier. Moreover, an opto-coupler creates a propagation delay in a feedback loop of a LED driver reducing dynamics and accuracy of any control system relying on measuring parameters at the output side of the regulator. Therefore, it would be desirable to control the output current of an isolated switching regulator without directly measuring the current or voltage at the output side of the regulator.

To produce the Iout level corresponding to the calculated Iout value, the peak current reference level Ipk* set by an output current control system may be adaptively adjusted in accordance with the input voltage Vin and the switch voltage Vsw in order to maintain a substantially constant level of the output current Iout despite input voltage variations caused by changes in input power line conditions and output voltage variations caused by changes in load conditions. In particular, the average output current Iout relates to the peak current reference level Ipk* as follows:

$$Iout = \frac{Ipk^*}{2} t_{off} \cdot f = \frac{Ipk^*}{2} \cdot \frac{t_{off}}{t_{on} + t_{off}} = \frac{Ipk^*}{2} \cdot \frac{\frac{1}{Vo'}}{\frac{1}{Vin} + \frac{1}{Vo'}} = \frac{Ipk^*}{2} \cdot \frac{Vin}{Vin + Vo'}.$$

The above equation may be rewritten as:

$$Ipk^* = 2Iout \frac{Vin + Vo'}{Vin}.$$

Considering that the reflected output voltage Vo' may be expressed as (Vsw−Vin), and taking into account the turns-ratio n of the transformer Tr, the peak current reference level Ipk* may be expressed as:

$$Ipk^* = 2Iout \frac{1}{n} \cdot \frac{Vsw}{Vin}.$$

Hence, the Iout level calculated based on the input voltage Vin and the reflected output voltage Vo' may be produced by respectively adjusting peak current reference level Ipk* in accordance with the input voltage Vin, switch voltage Vsw and the turns-ratio n.

Alternatively, the output current Iout can be determined by the input voltage Vin, the reflected output voltage Vo', and the input current Iin in the primary winding $w_{pr}$. Based on the energy conservation law, the energy conveyed from the input source is equal to the energy delivered to the output load.

Considering the switching circuit operating periodically, the average power from the input source is Vin·Iin, where Vin is the input voltage and Iin is the average input current in one cycle. Similarly, the average power to the output load is Vo·Iout, where Vo is the output voltage and Iout is the average output current in one cycle.

So, $$Vin \cdot Iin = Vo \cdot Iout$$

Thus, $$Iout = \frac{Vin \cdot Iin}{Vo}.$$

Meanwhile, the Vo is reflected to the primary side as Vo'=nVo, where n is the turns ratio between the primary side and secondary side, therefore, the output current can be determined by the input voltage, the input current and reflected output voltage.

$$Iout = \frac{n \cdot Vin \cdot Iin}{Vo'}.$$

Hence, the output current Iout may be calculated based on the input voltage Vin, the input current Iin and the reflected output voltage Vo'.

In some applications, the input voltage Vin may be a fixed value represented by a fixed parameter. In this case, the output current may be calculated based on the input current Iin, the reflected output voltage Vo' and the fixed parameter representing the input voltage Vin.

In BCM, the input current Iin is defined as the average of the switch current $i_{sw}$ in the whole switching cycle as shown in FIG. 4.

$$Iin = \frac{1}{T_s} \cdot \int_0^{DT_s} i_{sw} dt = \frac{I_{pk}^*}{2} \cdot \frac{t_{on}}{t_{on} + t_{off}},$$

where $T_s$ is the switching period, D is the duty cycle, $I_{pk}^*$ is the peak switch current, $t_{on}$ is switch on-time and $t_{off}$ is the switch off-time.

Figure 6:
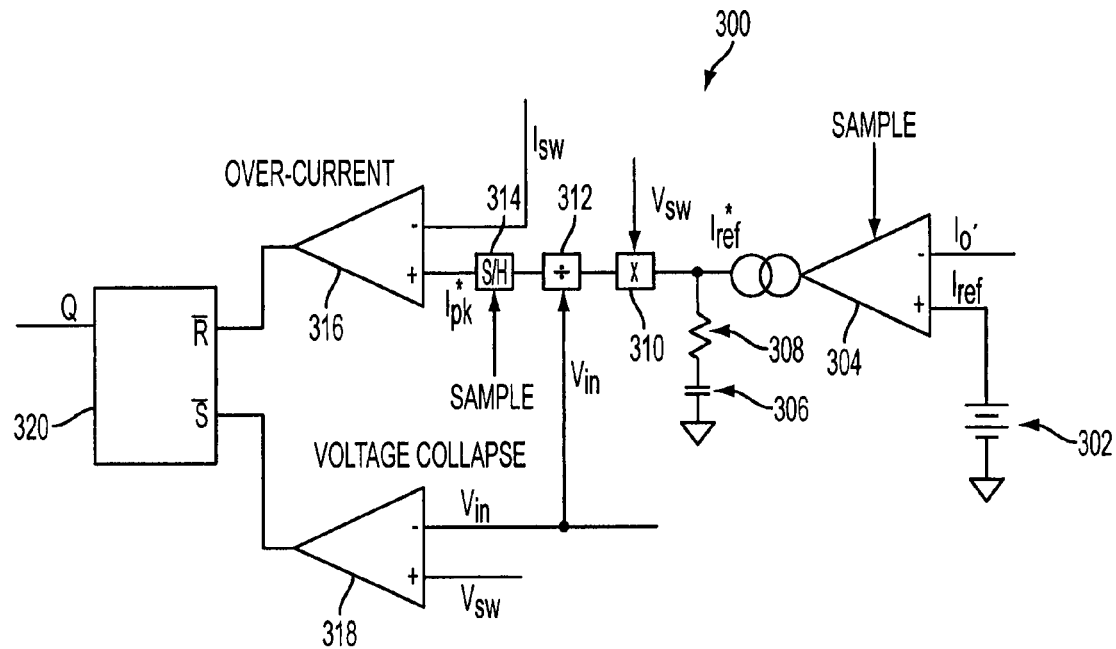
FIG. 6 illustrates an exemplary output current control system for operating a switching regulator in BCM in accordance with the present disclosure.

FIG. 6 illustrates an output current control scheme with adaptive peak current correction in accordance with the present disclosure. An exemplary control system 300 for controlling the output current of the switching regulator 10 in BCM includes a reference current source 302 that produces reference current Iref, and a PI regulator that compares reflected output current Io' of the switching regulator 10 with the reference current Iref. The reflected output current Io' represents current in the primary winding $w_{pr}$ corresponding to the output current in the secondary winding $w_{sec}$ of the switching regulator 10. For example, the reflected output current Io' may be determined based on the sense current in the sense resistor Rsense.

The PI regulator includes an operational amplifier 304 and an integrating circuit composed of a capacitor 306 and a resistor 308. The operational amplifier 304 compares the current Io' with the Iref value and performs sampling of this current difference with a sampling rate that may correspond to switching frequency f of the switching regulator 10. The elements of the PI regulator may be selected to produce an output signal Iref* of the PI regulator corresponding to value 2Iout/n.

A multiplier 310 connected to the output of the PI regulator is fed with the switch voltage Vsw to multiply the output signal Iref* of the PI regulator by the Vsw value. Further, a divider 312 is coupled to the output of the multiplier 310 to divide the output signal of the multiplier 310 by the input voltage value Vin. A sample-and-hold circuit 314 is coupled to the output of the divider 312 to sample the output signal of the divider 312 so as to set an adjusted peak current reference level $$Ipk^* = 2Iout\frac{1}{n} \cdot \frac{Vsw}{Vin}.$$

The sampling rate of the sample-and-hold circuit 314 may correspond to switching frequency f of the switching regulator 10.

The control system 300 further comprises an OC comparator 316, a VC comparator 318, and an RS flip-flop circuit 320 coupled to outputs of the comparators 316 and 318. The OC comparator 316 compares the switch current Isw with the adjusted peak current reference level Ipk* to produce an overcurrent signal OC when the switch current Isw reaches the adjusted peak current reference level Ipk*.

The VC comparator 318 compares the input voltage Vin with the switch voltage Vsw to produce a voltage collapse signal VC when the switch voltage Vsw falls below the input voltage Vin. The VC signal is supplied to the RS flip-flop circuit 320 to set a gate control signal at the Q-output of the RS flip-flop circuit 320. When the gate control signal is set, it turns on the switching element S. The OC signal is applied to the RS flip-flop circuit 320 to reset the gate control signal at the Q-output. When the gate control signal is reset, it turns off the switching element S. Hence, the output current control circuit 300 controls operation of the switching regulator 10 in the manner illustrated in the timing diagram of FIG. 5.

Figure 7:
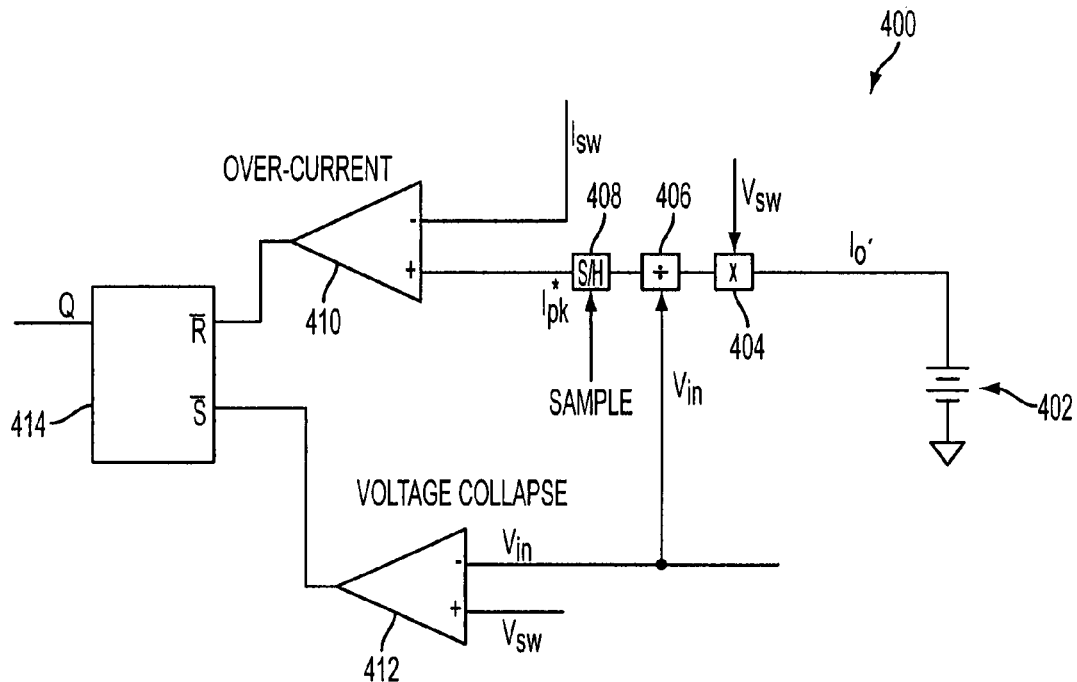
FIG. 7 illustrates another example of an output current control system for operating a switching regulator in BCM in accordance with the present disclosure.

The foregoing provides an effective switching control scheme in a flyback type regulator. However, it may be difficult to assess an output current in a secondary winding using a primary winding current sensing scheme. In addition, the delay and overshoot associated with the PI regulator may slow down a control system response during input voltage perturbation and load variation. FIG. 7 illustrates an example of an output current control scheme with adaptive peak current correction that does not need assessing a secondary winding output current based on a primary winding sense current and does not use the PI regulator for switching control.

As shown in FIG. 7, an exemplary output current control system 400 for controlling the switching regulator 10 in BCM comprises a reference current source 402 that directly sets an output current level Io' of the switching regulator 10 taking into consideration turns-ratio of the transformer Tr in the switching regulator 10. A multiplier 404 multiplies the Io' value by the Vsw value. Further, a divider 406 is coupled to the output of the multiplier 404 to divide the output signal of the multiplier 404 by the input voltage value Vin. A sample-and-hold circuit 408 is coupled to the output of the divider 406 to sample the output signal of the divider 406 so as to set an adjusted peak current reference level $$Ipk^* = 2Iout\frac{1}{n} \cdot \frac{Vsw}{Vin}.$$

The sampling rate of the sample-and-hold circuit 408 may correspond to switching frequency f of the switching regulator 10.

The control system 400 further comprises an OC comparator 410, a VC comparator 412, and an RS flip-flop circuit 416 coupled to outputs of the comparators 410 and 412 for controlling switching element S of the switching regulator 10 in a manner similar to switching control performed in the arrangement in FIG. 6.

Hence, the output current control arrangements in FIGS. 6 and 7 determine the output current level to produce the adjusted Ipk* value and control the switching element S of the switching regulator 10 to produce the determined current level at the output of the switching regulator 10. As a result, a substantially constant level of the output current may be maintained despite input voltage and output voltage variations.

Figure 8A:
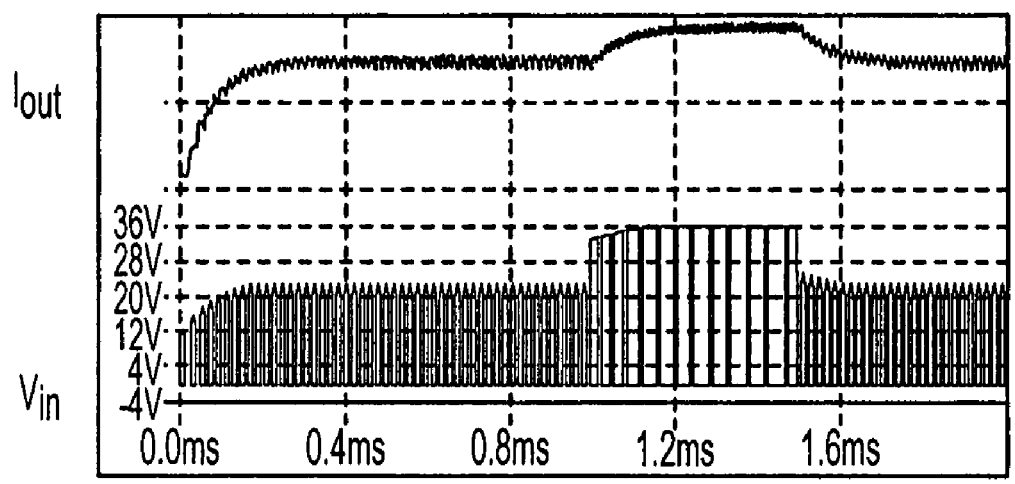
FIGS. 8A and 8B are diagrams illustrating output current of electronically simulated output current control systems with and without adaptive peak current correction.
Figure 8B:
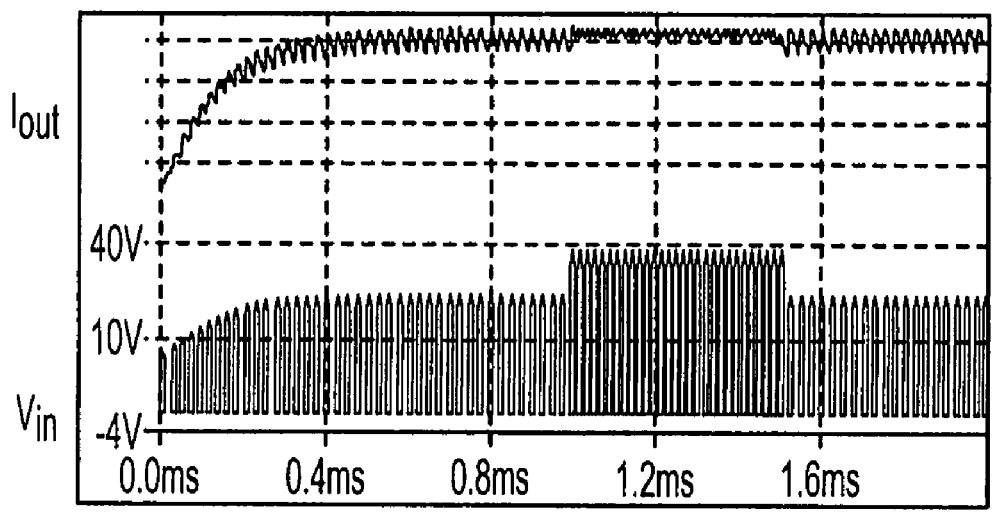

Efficiency of the output current control scheme of the present disclosure was confirmed by circuit simulation. FIG. 8A illustrates output current in a simulated conventional output current control system without adaptive peak correction, whereas FIG. 8B illustrates output current maintained using a simulated output current control system with the adaptive peak correction of the present disclosure. While in the conventional output current control system, a large output current bump is produced on an output current waveform I during input voltage Vin perturbations, the control system of the present disclosure maintains output current Iout almost at the same level when the input voltage Vin changes.

Figure 9:
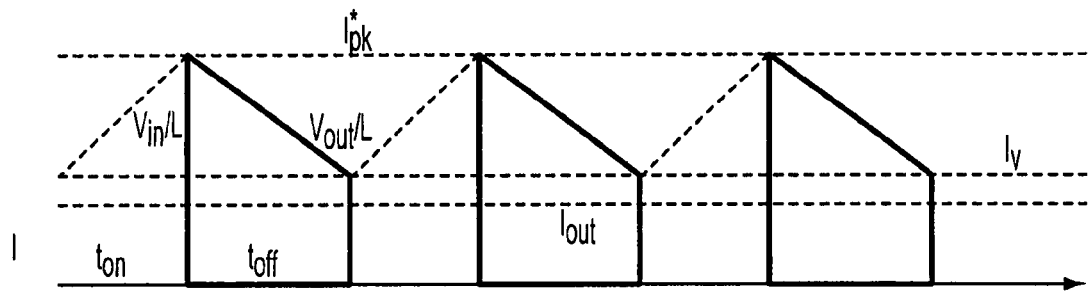
FIG. 9 is a timing diagram illustrating output current control for a switching regulator operating in CCM.

As illustrated by the timing diagram of FIG. 9, the output current control scheme of the present disclosure may be implemented to control the output current of the flyback regulator 10 in a continuous conduction mode (CCM). The waveform I represents the transformer current in the regulator 10 operating in CCM, in which the current varies between an upper limit defined by a peak current reference level Ipk*, and a bottom limit defined by a valley current level Iv higher than zero. Similar to the diagrams of FIGS. 4 and 5, the dotted up-slope of the waveform I represents current in the primary side of the regulator 10 during an on-time $t_{on}$ of the switching element S switching at frequency f, whereas the solid down-slope of the waveform I represents current in the secondary side of the regulator 10 during an off-time $t_{off}$ of the switching element S. The up-slope is determined by a ratio Vin/L, where Vin is the input voltage of the regulator 10 and L is the inductance of the transformer Tr. The down-slope is determined by a ratio Vout/L, where Vout is the output voltage of the switching regulator 10. The solid area in the waveform I represents the total charge transferred to the secondary side of the regulator 10. The output current Iout of the regulator 10 corresponds to the average value of the current over the switching cycle of the regulator 10.

The average output current Iout relates to the peak current reference level Ipk* as follows:

$$Iout = \frac{Ipk^* + Iv}{2} t_{off} \cdot f$$

$$= \frac{Ipk^* + Iv}{2} \cdot \frac{t_{off}}{t_{on} + t_{off}}$$

$$= \frac{Ipk^* + Iv}{2} \cdot \frac{\frac{1}{Vo'}}{\frac{1}{Vin} + \frac{1}{Vo'}}$$

$$= \frac{Ipk^* + Iv}{2} \cdot \frac{Vin}{Vin + Vo'}.$$

The above equation may be rewritten as:

$$Ipk^* = 2Iout \frac{Vin + Vo'}{Vin} - Iv.$$

Considering that the reflective output voltage Vo' may be expressed as (Vsw−Vin) and taking into account the turns-ratio n of the transformer Tr, the peak current reference level Ipk* may be expressed as:

$$Ipk^* = 2Iout \frac{1}{n} \cdot \frac{Vsw}{Vin} - Iv.$$

As discussed above, the output current Iout may also be calculated based on the input voltage Vin, the input current Iin and the reflected output voltage Vo' as follows:

$$Iout = \frac{n \cdot Vin \cdot Iin}{Vo'}.$$

In some applications, the input voltage Vin may be a fixed value represented by a fixed parameter. In this case, the output current may be calculated based on the input current Iin, the reflected output voltage Vo' and the fixed parameter representing the input voltage Vin.

In CCM, the input current Iin may be defined as the average of the switch current $i_{sw}$ in the whole switching cycle as shown in FIG. 9.

$$Iin = \frac{1}{T_s} \cdot \int_0^{DT_s} i_{sw} dt = \frac{I_v + I_{pk}^*}{2} \cdot \frac{t_{on}}{t_{on} + t_{off}},$$

where $T_s$ is the switching period, D is the duty cycle, Iv is the minimum switch current, $I^*_{pk}$ is the peak switch current, $t_{on}$ is switch on-time and $t_{off}$ is the switch off-time.

Figure 10:
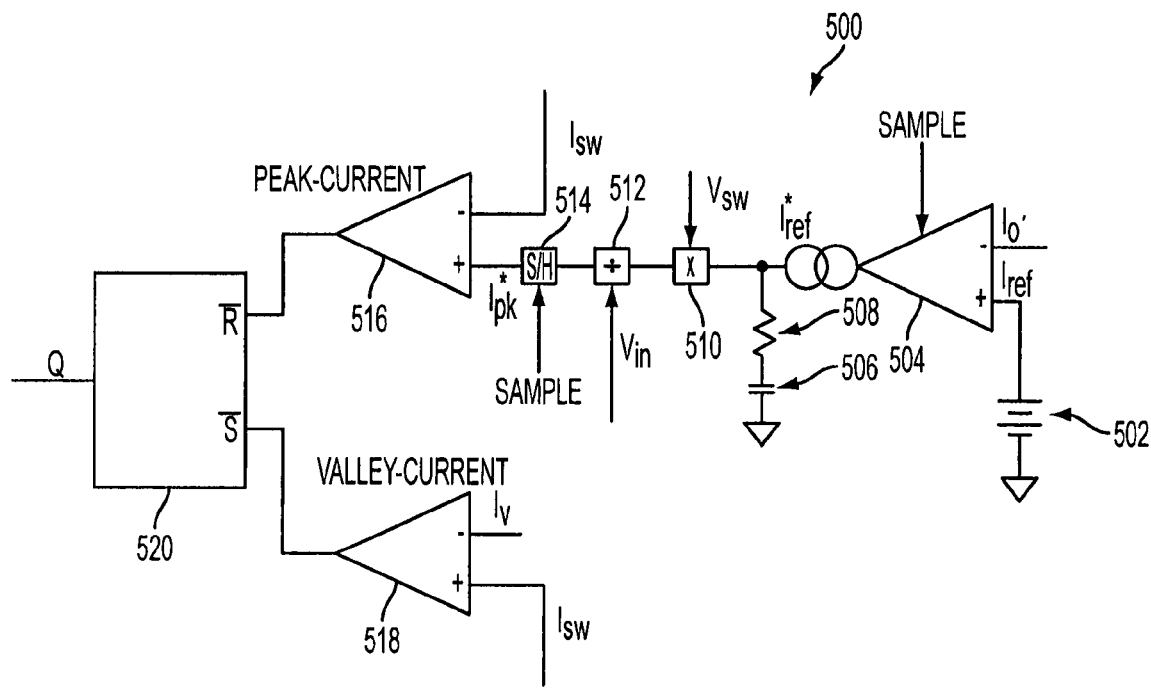
FIG. 10 illustrates an exemplary output current control system for operating a switching regulator in CCM in accordance with the present disclosure.

Referring to FIG. 10, an exemplary output current control system 500 of the present disclosure for controlling the output current of the switching regulator 10 operating in CCM includes a reference current source 502 that produces reference current Iref, and a PI regulator that compares reflected output current Io' of the switching regulator 10 with the reference current Iref. The PI regulator includes an operational amplifier 504 and an integrating circuit composed of a capacitor 506 and a resistor 508. The operational amplifier 504 compares the current Io' with the Iref value and performs sampling of this current difference with a sampling rate that may correspond to switching frequency f of the switching regulator 10. The elements of the PI regulator may be selected to produce an output signal Iref* of the PI regulator corresponding to value 2Iout/n.

A multiplier 510 connected to the output of the PI regulator is fed with the switch voltage Vsw to multiply the output signal Iref* of the PI regulator by the Vsw value. Further, a divider 512 is coupled to the output of the multiplier 510 to divide the output signal of the multiplier 510 by the input voltage value Vin. A sample-and-hold circuit 514 is coupled to the output of the divider 512 to sample the output signal of the divider 512 so as to set an adjusted peak current reference level $$Ipk^* = 2Iout \frac{1}{n} \cdot \frac{Vsw}{Vin} - Iv.$$

The sampling rate of the sample-and-hold circuit 514 may correspond to switching frequency f of the switching regulator 10.

The control system 500 further comprises a peak-current comparator 516, a valley-current comparator 518, and an RS flip-flop circuit 520 coupled to outputs of the comparators 516 and 518. The peak current comparator 516 compares the switch current Isw with the adjusted peak current reference level Ipk* to produce a peak-current signal when the switch current Isw reaches the adjusted peak current reference level Ipk*.

The valley-current comparator 518 compares the transformer current with the valley current level Iv to produce a valley-current signal which sets the minimum switch current Isw to the valley current level Iv. The valley-current signal is supplied to the RS flip-flop circuit 520 to set a gate control signal at the Q-output of the RS flip-flop circuit 520. When the gate control signal is set, it turns on the switching element S. The OC signal is applied to the RS flip-flop circuit 520 to reset the gate control signal at the Q-output. When the gate control signal is reset, it turns off the switching element S. Hence, the peak current reference level Ipk* is adaptively adjusted in accordance with the input voltage Vin variations to maintain a constant level of the output current Iout when the switch current Isw varies between the Ipk* level and Iv level.

Hence, the output current control arrangement in FIG. 10 provides control of the output current level in the switching regulator operating in CCM by calculating the output current level corresponding to the adjusted peak current reference level Ipk* and controlling the switching element S to produce the output current at the calculated level.

Further, the output current control scheme with peak current correction of the present disclosure may be implemented for controlling a switching regulator operating in a discontinuous conduction mode (DCM). As illustrated in the timing diagram of FIG. 11, in DCM, secondary winding current in the switching regulator 10 is equal to zero in each cycle of the switching regulator 10 during period $t_{dead}$. The dotted up-slope of the waveform I represents current in the primary winding of the regulator 10 during an on-time $t_{on}$ of the switching element S switching at frequency f, whereas the solid down-slope of the waveform I represents current in the secondary winding of the regulator 10 during an off-time $t_{off}$ of the switching element S. The up-slope is determined by a ratio Vin/L, where Vin is the input voltage of the regulator 10 and L is the inductance of the transformer Tr. The down-slope is determined by a ratio Vout/L, where Vout is the output voltage of the switching regulator 10. The solid area in the waveform I represents the total charge transferred to the secondary side of the regulator 10. The output current Iout of the regulator 10 corresponding to the average value of the current over the switching cycle of the regulator 10 relates to the peak current reference level Ipk* as follows:

$$Iout = \frac{Ipk^*}{2} t_{off} \cdot f = \frac{Ipk^*}{2} \cdot \frac{Ipk^*}{\frac{Vo'}{L}} \cdot f = \frac{Lf(Ipk^*)^2}{2Vo'}.$$

The above equation may be rewritten as:

$$Ipk^* = \sqrt{2Iout\frac{Vo'}{Lf}}.$$

Considering that the reflective output voltage Vo' may be expressed as (Vsw−Vin) and taking into account the turns-ratio n of the transformer, the peak current reference level Ipk* may be expressed as:

$$Ipk^* = \sqrt{\frac{2Iout}{n} \cdot \frac{Vsw - Vin}{Lf}}.$$

As discussed above, the output current Iout may also be determined based on the input voltage Vin, the input current Iin and the reflected output voltage Vo' as follows:

$$Iout = \frac{n \cdot Vin \cdot Iin}{Vo'}.$$

In some applications, the input voltage Vin may be a fixed value represented by a fixed parameter. In this case, the output current may be calculated based on the input current Iin, the reflected output voltage Vo' and the fixed parameter representing the input voltage Vin.

Figure 11:
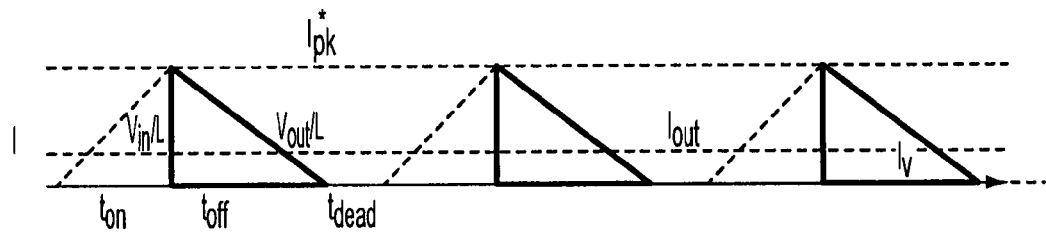
FIG. 11 is a timing diagram illustrating output current control for a switching regulator operating in DCM.

In DCM, the input current Iin may be defined as the average of the switch current $i_{sw}$ in the whole switching cycle as shown in FIG. 11:

$$Iin = \frac{1}{T_s} \cdot \int_0^{DT_s} i_{sw} dt = \frac{I_{pk}^*}{2} \cdot \frac{t_{on}}{t_{on} + t_{off} + t_{dead}},$$

where $T_s$ is the switching period, D is the duty cycle, $I_{pk}^*$ is the peak switch current, $t_{on}$ is switch on-time, $t_{off}$ is the switch off-time and $t_{dead}$ is the dead time in DCM.

Figure 12:
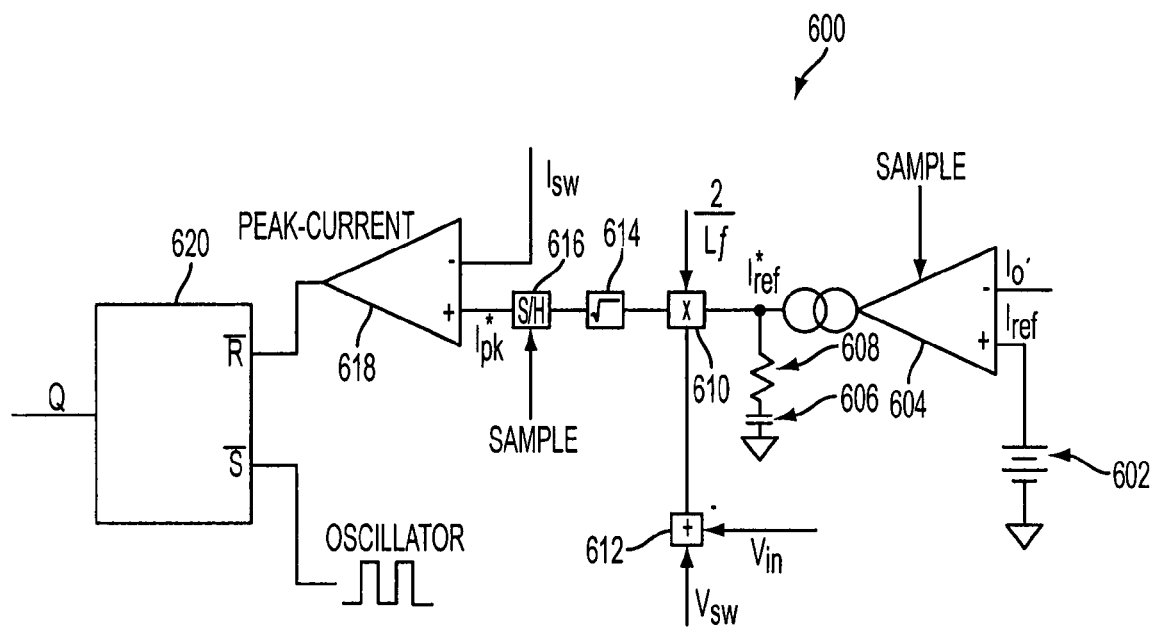
FIG. 12 illustrates an exemplary output current control system for operating a switching regulator in DCM in accordance with the present disclosure.

Referring to FIG. 12, an exemplary output current control system 600 of the present disclosure for controlling the output current of the switching regulator 10 operating in DCM includes a reference current source 602 that produces reference current Iref, and a PI regulator that compares reflected output current Io' of the switching regulator 10 with the reference current Iref. The PI regulator includes an operational amplifier 604 and an integrating circuit composed of a capacitor 606 and a resistor 608. The operational amplifier 604 compares the current Io' with the Iref value and performs sampling of this current difference with a sampling rate that may correspond to switching frequency f of the switching regulator 10.

A multiplier 610 connected to the output of the PI regulator is fed with an output signal of a subtractor 612 to multiply an output signal Iref* of the PI regulator by an output value of the subtractor 612 that determines a difference between the switch voltage Vsw and the input voltage Vin. Also, the multiplier 610 multiplies the output signal of the PI regulator by a value equal to 2/Lf. A square rooter 614 is coupled to the output of the multiplier 610 to determine the square root of the product at the output of the multiplier 610. A sample-and-hold circuit 616 is coupled to the output of the square rooter 614 to sample its output signal so as to set an adjusted peak current reference level $$Ipk^* = \sqrt{\frac{2Iout}{n} \cdot \frac{Vsw - Vin}{Lf}}.$$

The sampling rate of the sample-and-hold circuit 514 may correspond to switching frequency f of the switching regulator 10.

The control system 600 further comprises a peak-current comparator 618 and an RS flip-flop circuit 620 coupled to the output of the comparator 618. The peak current comparator 618 compares the switch current Isw with the adjusted peak current reference level Ipk* to produce a peak-current signal when the switch current Isw reaches the adjusted peak current reference level Ipk*. An external oscillator supplies the RS flip-flop circuit 620 with an oscillation signal at frequency f corresponding to the frequency of the switching element S to set a gate control signal at the Q-output of the RS flip-flop circuit 620. When the gate control signal is set, it turns on the switching element S. The peak-current signal from the peak current comparator 618 is applied to the RS flip-flop circuit 620 to reset the gate control signal at the Q-output. When the gate control signal is reset, it turns off the switching element S. Hence, the peak current reference level Ipk* is adaptively adjusted in accordance with the input voltage Vin variations to maintain a constant level of the output current Iout when the switching regulator 10 operates in DCM.

Hence, the output current control arrangement in FIG. 12 controls the output current level in DCM by calculating the output current value required to produce the adjusted peak current reference level Ipk* and controlling the switching element S to produce the output current at the calculated level.

As discussed above, the output current control scheme with adaptive peak current correction of the present disclosure may be used for controlling output current of a flyback switching regulator for a LED driver. Since the light emission of a LED is directly related to current flowing through the LED, the control scheme of the present disclosure makes it possible to avoid LED flicker by maintaining a desired level of the output current in the switching regulator despite input voltage variations and changes in load conditions.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A method of controlling an output current of switching circuitry having an input circuit for receiving an input voltage and an input current, and an output circuit for developing an output voltage, the output circuit electrically isolated from the input circuit, comprising the steps of:
   determining a value of the output current in the output circuit based on the input voltage, the input current and a reflected output voltage obtained at the input circuit, and
   controlling a switching element in the input circuit to produce the determined value of output current.

2. The method of claim 1, wherein the output current value is determined so as to reduce variation of the output current with a change in the input voltage and the output voltage.

3. The method of claim 1, wherein the switching element is controlled to operate the switching circuit in a boundary conduction mode.

4. The method of claim 1, wherein the switching element is controlled to operate the switching circuit in a continuous conduction mode.

5. The method of claim 1, wherein the switching element is controlled to operate the switching circuit in a discontinuous conduction mode.

6. The method of claim 1, wherein the switching circuitry includes an inductive element having a first winding isolated from a second winding.

7. A method of controlling an output current of switching circuitry having an input circuit for receiving an input current and an input voltage represented by a fixed parameter, and an output circuit for developing an output voltage, the output circuit electrically isolated from the input circuit, comprising the steps of:
   determining a value of the output current in the output circuit based on the input current, the fixed parameter and a reflected output voltage obtained at the input circuit, and
   controlling a switching element in the input circuit to produce the determined value of output current.

8. The method of claim 7, wherein the switching element is controlled to operate the switching circuit in a boundary conduction mode.

9. The method of claim 7, wherein the switching element is controlled to operate the switching circuit in a continuous conduction mode.

10. The method of claim 7, wherein the switching element is controlled to operate the switching circuit in a discontinuous conduction mode.

11. A system for controlling an output current of switching circuitry including an input circuit for receiving an input voltage and an input current, and an output circuit for producing an output voltage, the output circuit electrically isolated from the input circuit, the system comprising:
   a switching control circuit for controlling a switching element in the input circuit so as to control the output current in the output circuit,
   the switching control circuit being configured for determining a value of the output current based on the input voltage, the input current, and a reflected output voltage obtained at the input circuit, and for controlling the switching element to reduce variation of the output current with change in the input voltage and the output reflected voltage.

12. The system of claim 11, wherein the switching control circuit further is configured to control the switching element to produce the output current that is proportional to the input voltage.

13. The system of claim 11, wherein the switching control circuit further is configured to control the switching element to produce the output current that is proportional to the input current.

14. The system of claim 11, wherein the switching control circuit further is configured to control the switching element to produce the output current that is inversely proportional to the reflected output voltage.

15. The system of claim 11, wherein the input circuit includes a primary winding of an inductive element, and the output circuit includes a secondary winding of the inductive element.

16. The system of claim 15, wherein the switching control circuit further is configured to control the switching element to produce the output current that is proportional to a turns-ratio of the inductive element.

17. The system of claim 11, wherein the switching control circuit is configured to operate the switching circuit in a boundary conduction mode.

18. The system of claim 11, wherein the switching control circuit is configured to operate the switching circuit in a continuous conduction mode.

19. The system of claim 11, wherein the switching control circuit is configured to operate the switching circuit in a discontinuous conduction mode.

20. A system for controlling an output current of switching circuitry including an input circuit for receiving an input current and an input voltage represented by a fixed parameter, and an output circuit for producing an output voltage, the output circuit electrically isolated from the input circuit, the system comprising:
   a switching control circuit for controlling a switching element in the input circuit so as to control the output current in the output circuit,
   the switching control circuit being configured for determining a value of the output current based on the input current, the fixed parameter and a reflected output voltage obtained at the input circuit, and for controlling the switching element to reduce variation of the output current with change in the input voltage and the output voltage.

21. The system of claim 20, wherein the switching control circuit is configured to operate the switching circuit in a boundary conduction mode.

22. The system of claim 20, wherein the switching control circuit is configured to operate the switching circuit in a continuous conduction mode.

23. The system of claim 20, wherein the switching control circuit is configured to operate the switching circuit in a discontinuous conduction mode.

24. A system for driving a light-emitting diode (LED), comprising:
   a switching regulator for providing power supply to drive the LED, the switching regulator including an input circuit for receiving an input voltage and an input current, and an output circuit for developing an output voltage, electrically isolated from the input circuit; and
   a control circuit for controlling current in the output circuit of the switching regulator, the control circuit being configured for producing the current in the output circuit based on the input voltage, the input current, and a reflected output voltage obtained at the input circuit.

25. The system of claim 24, wherein the input circuit includes a primary winding of an inductive element, and the output circuit includes a secondary winding of the inductive element.

26. The system of claim 24, wherein the control circuit is configured to operate the switching regulator in a boundary conduction mode.

27. The system of claim 24, wherein the control circuit is configured to operate the switching circuit in a continuous conduction mode.

28. The system of claim 24, wherein the control circuit is configured to operate the switching circuit in a discontinuous conduction mode.

29. A method of controlling switching circuitry of a type having an input circuit for receiving an input voltage and an output circuit for developing an output voltage, the output circuit electrically isolated from the input circuit, comprising the steps of:
   determining a value of output current in the output circuit based on the input voltage and a reflected output voltage obtained at the input circuit, and
   controlling a switching element in the input circuit to produce the determined value of output current.

30. The method of claim 29, wherein the output current value is determined so as to reduce variation of the output current with a change in the input voltage and the output voltage.

31. The method of claim 29, wherein the switching element is controlled to operate the switching circuit in a boundary conduction mode.

32. The method of claim 29, wherein the switching element is controlled to operate the switching circuit in a continuous conduction mode.

33. The method of claim 29, wherein the switching circuit includes an inductive element having a first winding isolated from a second winding.

34. A method of controlling switching circuitry operating in a discontinuous conduction mode and including an input circuit and an output circuit for producing an output voltage, the output circuit electrically isolated from the input circuit, comprising the steps of:
   determining a value of output current in the output circuit based on a reflected output voltage obtained at the input circuit, and
   controlling a switching element in the input circuit to produce the determined value of output current.

35. A system for controlling switching circuitry including an input circuit for receiving an input voltage and an output circuit for producing an output voltage, the output circuit electrically isolated from the input circuit, the system comprising:
   a switching control circuit for controlling a switching element in the input circuit so as to control current in the output circuit,
   the switching control circuit being configured for determining a value of the current in the output circuit based on the input voltage and a reflected output voltage obtained at the input circuit, and for controlling the switching element to reduce variation of the current in the output circuit with change in the input voltage and the output voltage.

36. The system of claim 35, wherein the switching control circuit further is configured to control the switching element to produce current in the output circuit that is proportional to the input voltage.

37. The system of claim 35, wherein the switching control circuit further is configured to control the switching element for producing current in the output circuit that is inversely proportional to the sum of the input voltage and the reflected output voltage.

38. The system of claim 35, wherein the input circuit includes a primary winding of an inductive element, and the output circuit includes a secondary winding of the inductive element.

39. The system of claim 35, wherein the switching control circuit further is configured to adjust switch current in the switching element for producing the current in the output circuit at a level corresponding to the determined value.

40. The system of claim 39, wherein the switching control circuit further is configured to adjust a peak level of the switch current in the switching element for producing the current in the output circuit at a level corresponding to the determined value.

41. The system of claim 40, wherein the switching control circuit includes a comparator for comparing the switch current with a reference value to switch the switching element when the switch current exceeds the reference value.

42. The system of claim 41, wherein the switching control circuit further includes a reference circuit for producing the reference value.

43. The system of claim 42, wherein the reference circuit is configured for producing the reference value inversely proportional to the input voltage.

44. The system of claim 43, wherein the reference circuit is configured for producing the reference value that is proportional to the sum of the input voltage and the reflected output voltage.

45. The system of claim 44, wherein the input circuit includes a primary winding of an inductive element, the output circuit includes a secondary winding of the inductive element, and the reference circuit is configured to provide the reference value proportional to a turns-ratio of the inductive element.

46. The system of claim 35, wherein the switching control circuit is configured to operate the switching circuit in a boundary conduction mode.

47. The system of claim 35, wherein the switching control circuit is configured to operate the switching circuit in a continuous conduction mode.

48. A system for controlling switching circuitry including an input circuit and an output circuit for developing an output voltage, the output circuit electrically isolated from the input circuit, the system comprising:
   a switching control circuit for controlling a switching element in the input circuit to control current in the output circuit of the switching circuit,
   the switching control circuit being configured to operate the switching circuit in a discontinuous conduction mode,
   the switching control circuit being further configured to control the switching element for producing the current in the output circuit based on a reflected output voltage obtained at the input circuit.

49. The system of claim 48, wherein the switching control circuit further is configured to control the switching element for producing the current in the output circuit inversely proportional to the reflected output voltage.

50. The system of claim 48, wherein the input circuit includes a primary winding of an inductive element, and the output circuit includes a secondary winding of the inductive element.

51. The system of claim 50, wherein the switching control circuit is configured to control the switching element for producing the current in the output circuit directly proportional to inductance of the inductive element.

52. The system of claim 51, wherein the switching control circuit is configured to control the switching element for producing the current in the output circuit directly proportional to a switching frequency of the switching element.

53. The system of claim 52, wherein the switching control circuit is configured to adjust switch current in the switching element in accordance with the input voltage supplied to the switching circuit.

54. The system of claim 53, wherein the switching control circuit includes a comparator for comparing the switch current with a reference value to switch the switching element when the switch current exceeds the reference value.

55. The system of claim 54, wherein the switching control circuit includes a reference circuit for producing the reference value proportional to square root of the reflected output voltage.

56. The system of claim 55, wherein the reference circuit is configured for producing the reference value inversely proportional to square root of the inductance of the inductive element.

57. The system of claim 56, wherein the reference circuit is configured for producing the reference value inversely proportional to square root of the switching frequency of the switching element.

* * * * *